United States Patent
Nakaizumi

(10) Patent No.: US 10,953,824 B2
(45) Date of Patent: Mar. 23, 2021

(54) WIRE ROUTING STRUCTURE

(71) Applicant: SUMITOMO WIRING SYSTEMS, LTD., Yokkaichi (JP)

(72) Inventor: Takuya Nakaizumi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 18 days.

(21) Appl. No.: 16/492,893

(22) PCT Filed: Feb. 23, 2018

(86) PCT No.: PCT/JP2018/006691
§ 371 (c)(1),
(2) Date: Sep. 10, 2019

(87) PCT Pub. No.: WO2018/168399
PCT Pub. Date: Sep. 20, 2018

(65) Prior Publication Data
US 2020/0070745 A1 Mar. 5, 2020

(30) Foreign Application Priority Data
Mar. 16, 2017 (JP) .............................. JP2017-051301

(51) Int. Cl.
*B60R 16/02* (2006.01)
*F16B 2/08* (2006.01)
*H02G 3/32* (2006.01)

(52) U.S. Cl.
CPC ............ *B60R 16/0215* (2013.01); *F16B 2/08* (2013.01); *H02G 3/32* (2013.01)

(58) Field of Classification Search
None
See application file for complete search history.

(56) References Cited

U.S. PATENT DOCUMENTS

| | | | | | |
|---|---|---|---|---|---|
| 1,856,109 | A | * | 5/1932 | Murray | H01B 9/0666 174/146 |
| 2,404,110 | A | * | 7/1946 | Trafton | F16L 3/12 248/74.3 |

(Continued)

FOREIGN PATENT DOCUMENTS

| | | |
|---|---|---|
| JP | S60-086607 U | 6/1985 |
| JP | 2012-110100 A | 6/2012 |
| JP | 6063840 B2 | 1/2017 |

OTHER PUBLICATIONS

Mar. 27, 2018 International Search Report issued in International Patent Application No. PCT/JP2018/006691.

(Continued)

*Primary Examiner* — Binh B Tran
*Assistant Examiner* — Muhammed Azam
(74) *Attorney, Agent, or Firm* — Oliff PLC

(57) ABSTRACT

A wire routing structure includes a main body held by a vehicle body fixing member, and which includes a plurality of spaces having a plurality of wires inserted therein, and a partitioning structure that partitions the respective spaces. The main body has a split structure that allows the main body to be opened. The vehicle body fixing member includes a fixing section configured to be fixed to a vehicle body, and a holding section connected to the fixing section and holding the main body. The holding section includes a band fixing structure including a band that holds the main body in a closed state.

10 Claims, 14 Drawing Sheets

(56) References Cited

U.S. PATENT DOCUMENTS

| | | | | |
|---|---|---|---|---|
| 2,683,578 A * | 7/1954 | Rainey | H01B 17/306 | 248/68.1 |
| 3,157,377 A * | 11/1964 | Orenick | F16L 3/127 | 248/71 |
| 3,341,903 A * | 9/1967 | Buntic | F16B 2/08 | 24/16 PB |
| 3,454,247 A * | 7/1969 | Geisinger | H01B 17/26 | 248/56 |
| 4,128,220 A * | 12/1978 | McNeel | F16B 2/08 | 24/16 PB |
| 4,864,082 A * | 9/1989 | Ono | H02G 3/0437 | 174/97 |
| 4,971,647 A * | 11/1990 | Leslie | B23P 19/004 | 156/249 |
| 5,004,194 A * | 4/1991 | Watanabe | F16L 55/035 | 248/74.5 |
| 5,106,040 A * | 4/1992 | Cafmeyer | H02G 3/26 | 248/292.14 |
| 5,131,613 A * | 7/1992 | Kamiya | F16L 3/233 | 24/16 PB |
| 5,257,768 A * | 11/1993 | Juenemann | F16L 55/035 | 248/604 |
| 5,305,797 A * | 4/1994 | Roy, Sr. | F16L 3/26 | 138/103 |
| 5,402,970 A * | 4/1995 | Fujishita | F16B 2/08 | 248/71 |
| 5,526,549 A * | 6/1996 | Mori | F16L 5/02 | 16/2.1 |
| 5,581,850 A * | 12/1996 | Acker | F16L 3/23 | 24/16 PB |
| 5,962,814 A * | 10/1999 | Skipworth | B60R 16/0215 | 174/135 |
| 6,042,062 A * | 3/2000 | Sugiyama | B60R 16/0215 | 174/72 A |
| 6,323,428 B1 * | 11/2001 | Takano | B60R 16/0215 | 174/117 F |
| 6,528,728 B1 * | 3/2003 | Shima | H02G 3/0437 | 174/101 |
| 6,706,969 B1 * | 3/2004 | Young | F16L 3/22 | 174/95 |
| 6,861,589 B2 * | 3/2005 | Katsumata | H02G 3/0487 | 174/68.3 |
| 6,888,067 B1 * | 5/2005 | Howland | H01R 13/5208 | 174/74 R |
| 7,150,439 B2 * | 12/2006 | Konold | F16L 3/1075 | 248/74.1 |
| 7,514,630 B2 * | 4/2009 | Anderson | H02G 3/30 | 174/135 |
| 8,013,248 B2 * | 9/2011 | Sakata | H02G 3/0691 | 174/68.1 |
| 8,729,394 B2 * | 5/2014 | Clark | H01B 11/08 | 174/113 R |
| 8,981,221 B2 * | 3/2015 | Sawada | B60K 1/04 | 174/72 A |
| 8,987,601 B2 * | 3/2015 | Shiga | B60R 16/0215 | 174/135 |
| 9,464,734 B2 * | 10/2016 | Okura | H02G 3/22 | |
| 9,732,884 B1 * | 8/2017 | Keller | F16L 3/2235 | |
| 10,109,394 B2 * | 10/2018 | Yamamoto | H01B 7/368 | |
| 2004/0238204 A1 * | 12/2004 | Ono | F16B 21/084 | 174/135 |
| 2006/0243868 A1 * | 11/2006 | Nakamura | G02B 6/3636 | 248/113 |
| 2007/0187144 A1 * | 8/2007 | Kato | B60R 16/0215 | 174/72 A |
| 2007/0272807 A1 * | 11/2007 | Takagaki | F16B 21/086 | 248/71 |
| 2010/0319165 A1 * | 12/2010 | Skarpil | H02G 3/32 | 24/115 A |
| 2011/0260025 A1 * | 10/2011 | Aoshima | B60R 16/0215 | 248/231.81 |
| 2011/0315823 A1 * | 12/2011 | Sabadie | B64C 1/406 | 244/131 |
| 2012/0006947 A1 * | 1/2012 | Gundel | F16L 3/02 | 248/68.1 |
| 2012/0132761 A1 * | 5/2012 | Elsmore | F16L 3/1075 | 248/74.1 |
| 2013/0269981 A1 * | 10/2013 | Shiga | B60R 16/0215 | 174/136 |
| 2014/0041899 A1 * | 2/2014 | Inagaki | H02G 11/00 | 174/152 G |
| 2014/0110011 A1 * | 4/2014 | Omura | H02G 3/0468 | 138/109 |
| 2014/0131528 A1 * | 5/2014 | Blakeley | H02G 3/32 | 248/74.2 |
| 2014/0338971 A1 * | 11/2014 | Yoshida | H01B 7/0045 | 174/72 A |
| 2015/0041175 A1 * | 2/2015 | Nakai | B60R 16/0215 | 174/83 |
| 2015/0083462 A1 * | 3/2015 | Yoshida | F16B 2/06 | 174/136 |
| 2015/0102183 A1 * | 4/2015 | Yamaguchi | B60R 16/0215 | 248/74.3 |
| 2015/0121658 A1 * | 5/2015 | Kamigaichi | B60R 16/0215 | 24/16 PB |
| 2015/0165986 A1 * | 6/2015 | Morris | B60R 16/0215 | 280/728.2 |
| 2015/0222106 A1 * | 8/2015 | Caspari | F16L 3/08 | 174/651 |
| 2016/0047494 A1 * | 2/2016 | Dickinson | B60R 16/0215 | 248/74.2 |
| 2016/0254654 A1 | 9/2016 | Matsumura | | |
| 2016/0284440 A1 * | 9/2016 | Adachi | H02G 3/0691 | |
| 2016/0322797 A1 * | 11/2016 | Kimoto | H02G 3/04 | |
| 2016/0372907 A1 * | 12/2016 | Suenaga | H01B 7/0045 | |
| 2017/0001580 A1 * | 1/2017 | Hagi | B60R 16/0215 | |
| 2017/0004903 A1 * | 1/2017 | Suenaga | B60R 16/0215 | |
| 2017/0074299 A1 * | 3/2017 | Lee | B65D 63/1072 | |
| 2017/0076841 A1 | 3/2017 | Nakai et al. | | |
| 2017/0146154 A1 * | 5/2017 | Tally | H02G 3/32 | |
| 2017/0250528 A1 * | 8/2017 | Fujiki | H01B 7/0045 | |
| 2017/0349327 A1 * | 12/2017 | Cwojdzinski | B65D 23/003 | |
| 2018/0058609 A1 * | 3/2018 | Van Hulst | F16L 3/127 | |
| 2018/0072248 A1 * | 3/2018 | Ohashi | F16L 3/1075 | |
| 2018/0274699 A1 * | 9/2018 | Ratzlaff | F16L 3/1075 | |
| 2018/0278033 A1 * | 9/2018 | Yamao | B60R 16/0215 | |
| 2018/0361959 A1 * | 12/2018 | Toyosaka | B60R 16/0215 | |
| 2019/0047489 A1 * | 2/2019 | Sone | B60R 16/0207 | |
| 2019/0148924 A1 * | 5/2019 | Hara | H02G 3/0406 | 174/72 A |
| 2019/0277429 A1 * | 9/2019 | Shinba | F16L 3/233 | |
| 2019/0305531 A1 * | 10/2019 | Fujimura | H02G 3/03 | |

OTHER PUBLICATIONS

Jun. 25, 2018 International Preliminary Report on Patentability issued in International Patent Application No. PCT/JP2018/006691.

* cited by examiner

WIRE ROUTING STRUCTURE

BACKGROUND

Patent Publication JP 6063840 discloses a wire alignment structure including (i) a tubular member, (ii) a plurality of wires inserted into the tubular member and having a drawn-out section drawn out of an end opening of the tubular member, (iii) a terminal metal fitting connected to a tip end of the drawn-out section of each wire, and (iv) an alignment tool positioned between an end of the tubular member and the terminal metal fitting to align each wire. By having the drawn-out section of each wire aligned by the alignment tool, the drawn-out section can automatically come to a position in which it can connect with a counterpart terminal to which the terminal metal fitting corresponds. Connection work between the terminal metal fitting and the counterpart terminal can be performed without any problems.

SUMMARY

Incidentally, for example, when trying to draw each wire in to the inside of the vehicle via a hole of a vehicle body panel, according to the above structure, there was a possibility that an alignment tool gets caught on the vehicle body panel and cannot pass through the hole. Additionally, if the alignment tool is positioned at a tip of the drawn-out section of each wire, there was also a problem that freedom of handling the drawn-out section is limited.

Based on the above situation, this invention was completed. An object of this invention is to provide a wire routing structure capable of improving drawing in and handling freedom of each wire.

A wire routing structure of this invention comprises a main body held by a vehicle body fixing member. The main body includes (a) a plurality of spaces having a plurality of wires inserted therein, and (b) a partitioning structure that partitions the respective spaces. The main body has a split structure that can be opened via a division surface. In an opened state of the main body, the respective wires can be inserted inside the main body. The vehicle body fixing member, which is separate from the main body, includes (i) a fixing section fixed to a vehicle body, and (ii) a holding section connected to the fixing section and holding the main body. The holding section is constituted by a band fixing structure in which a band is wound around an outer periphery of the main body. By having the band of the band fixing structure wound around the main body and fixing the main body, the main body is held in a closed state and does not return to an opened state.

In the wiring routing structure of this invention, by having a plurality of wires inserted into the corresponding spaces of the main body, arrangement of each wire is established. Thus, each wire can fit a specified connection counterpart, and connection work can be smoothly performed.

Additionally, the main body is held by the vehicle body fixing member; thus, arrangement of each wire is established at a position in which the vehicle body fixing member is fixed to a vehicle body, and a free length (a wire length of a section that is not fixed) of the drawn-out section of each wire that is drawn out of the vehicle body fixing position can be kept long. As a result, the drawing in and handling freedom of each wire can be improved.

Additionally, the main body has a divided structure that can be opened via a division surface, and in an opened state of the main body, each wire can be inserted into the corresponding space. According to this, routing of each wire to the main body can be performed at a final stage of manufacturing steps (assembly step), and workability can be improved.

Additionally, in the wire routing structure of this invention, the vehicle body fixing member is separate from the main body, and includes (i) a fixing section fixed to the vehicle body, and (ii) a holding section connected to the fixing section and holding the main body. According to this, the main body will be arranged at the same position as the vehicle body fixing member. Thus, the main body itself does not occupy a separate place, which provides a spatial advantage, and the structure can be simplified.

Additionally, the holding section comprises a band fixing structure in which a band is wound around an outer periphery of the main body. According to this, even if the size and shape of the outer periphery of the main body are changed, this can be flexibly handled by adjusting a winding diameter of the band. Furthermore, an existing clip for fixing a vehicle body can be used as the vehicle body fixing member.

DETAILED DESCRIPTION OF EMBODIMENTS

The following shows desirable modes of this invention.

It is beneficial if the main body is provided with a tongue piece that protrudes along the drawn-out direction of each of the wire. By having each wire fixed to the tongue piece, a free length of the drawn-out section of each wire is adjusted to a specified length; thus, each wire can accurately fit a connection counterpart, and a situation can be avoided in which misconnection or the like occurs.

It is beneficial if the partitioning structure of the main body is made of a rubber material capable of elastically holding the wires inserted into the spaces. The partitioning structure elastically holds the respective wires; thus, the free length of the drawn-out section of each wire is adjusted to a specified length. Therefore, each wire can accurately fit a connection counterpart, and a situation can be avoided in which misconnection or the like occurs.

<Embodiment 1>

The following shows embodiment 1 of this invention with reference to FIGS. 1-6. This embodiment 1 shows an example of a wire routing structure 10 of a plurality of wires 60 routed along a vehicle body panel 90 inside of a vehicle.

Figure 6:
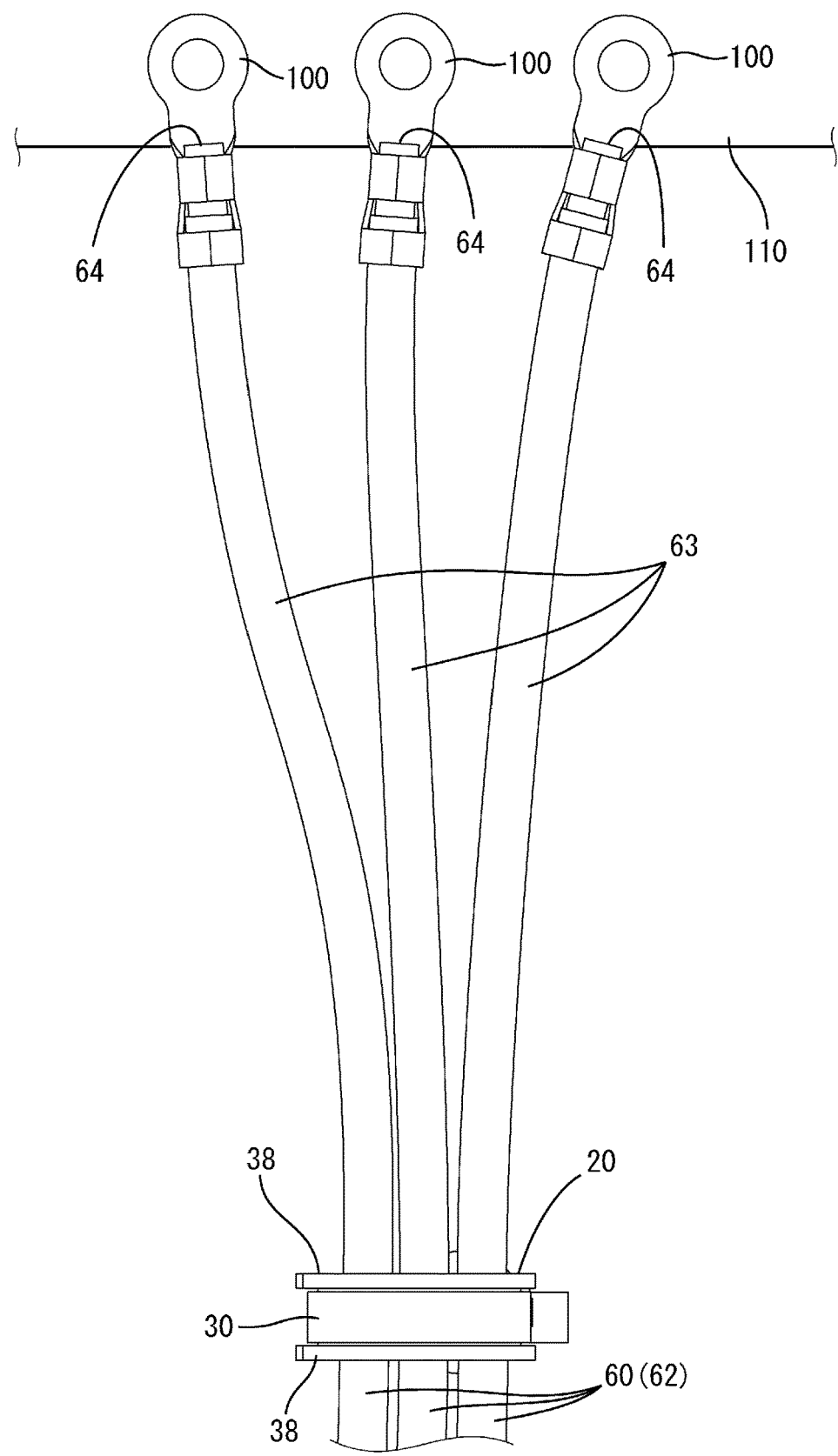
FIG. 6 is a plan view showing a state in which terminal metal fittings connected to ends of wires are arranged so as to fit connection counterparts.

The wires 60 comprise (i) core wire sections 64 using copper or aluminum as main components, and (ii) coatings 61 made of insulating resin which surround the core wire sections 64. As shown in FIG. 6, at ends of the wires 60, terminal metal fittings 100 are connected by crimping to the core wire sections 64 that are exposed by removing the coatings 61. The terminal metal fittings 100 are electrically connected to connection counterparts 110.

Each wire 60 of the wire routing structure 10 has an extending section 62 extending from an end of an exterior cladding member (undepicted), such as a corrugated tube, disposed along a drawing-in path into the interior of a vehicle. In the extending section 62, arrangement of each wire 60 is established by a wire routing member 20 at a vehicle body fixing position FP along the route (see FIG. 2). Additionally, the wire routing member 20 is held by a vehicle body fixing member 21 that is fixed to the vehicle body panel 90. The above vehicle body fixing position FP refers to a position at which the vehicle body fixing member 21 is fixed to the vehicle body.

In each wire 60 of the extending section 62, an extending section 63 from the vehicle body fixing position FP to the terminal metal fitting 100 is substantially a free length so as not to be fixed to the vehicle body panel 90 or the like. The extending section 63 has a sufficient length, ensuring a high degree of freedom in handling each wire.

Figure 1:
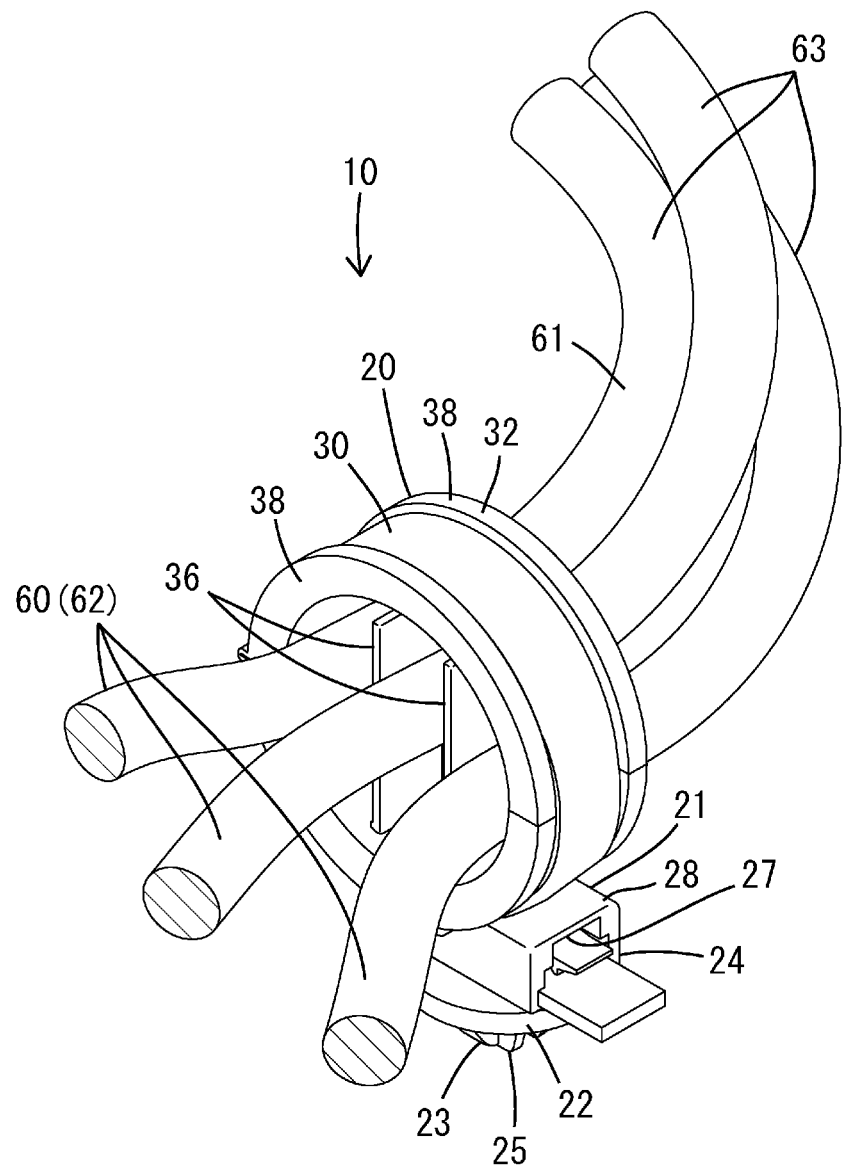
FIG. 1 is a perspective view of a wire routing structure of embodiment 1 of this invention.
Figure 2:
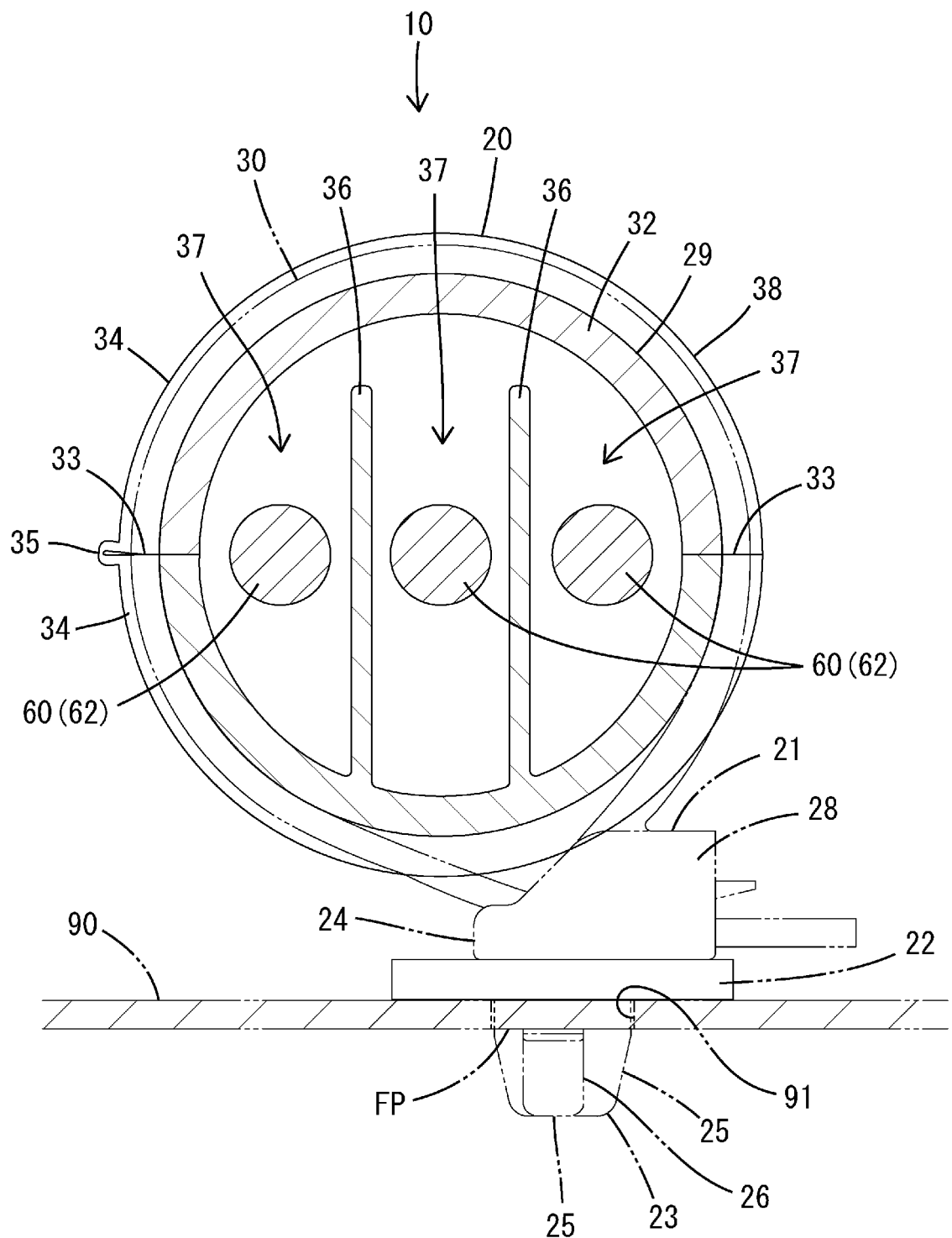
FIG. 2 is a cross-sectional view in a front view direction of the wire routing structure.

The vehicle body fixing member 21 is made of synthetic resin. As shown in FIGS. 1 and 2, it is provided with (i) a fixing section 23 and (ii) a holding section 24 connected to the top of the fixing section 23.

The fixing section 23 is constituted by (i) a flat plate-like substrate section 22, (ii) a leg-piece-like leg section 25 projecting downward from the substrate section 22 to penetrate the vehicle body panel 90 in a plate thickness direction, and (iii) a plurality of locking claws 26 (a pair is used in the figures) projecting outward from a tip end of the leg section 25. As shown in FIG. 2, when the leg section 25 goes through a hole 91 of the vehicle body panel 90, the substrate section 22 is disposed at a surface of the vehicle body panel 90, and each locking claw 26 is elastically locked at an opening edge of the hole 91 at a back surface of the vehicle body panel 90. Thus, the vehicle body panel 90 is sandwiched in the plate thickness direction between the substrate section 22 and each locking claw 26, and the vehicle body fixing member 21 is attached and fixed to the vehicle body panel 90. Additionally, the leg section 25 has a non-circular cross-sectional shape and passes through the hole 91 of the panel 90 with its rotation restricted.

The holding section 24 is provided with (i) a band locking section 28 protrudingly provided at an upper surface of the substrate section 22 and having a locking hole 27 (see FIG. 1) and (ii) a flexible belt-like band 30 extending from the band locking section 28 and wound around (circling) a later-mentioned band fastening surface 29 of the wire routing member 20. A locking structure (undepicted) is arranged at one surface of the band 30 and an inner surface of the locking hole 27. The band 30 is wound around the band fastening surface 29 of the wire routing member 20, and a tip end of the band 30 is inserted into the locking hole 27 and is locked by the locking structure. Thus, while the band 30 maintains a specified loop diameter, it is fixed to the wire routing member 20.

Figure 4:
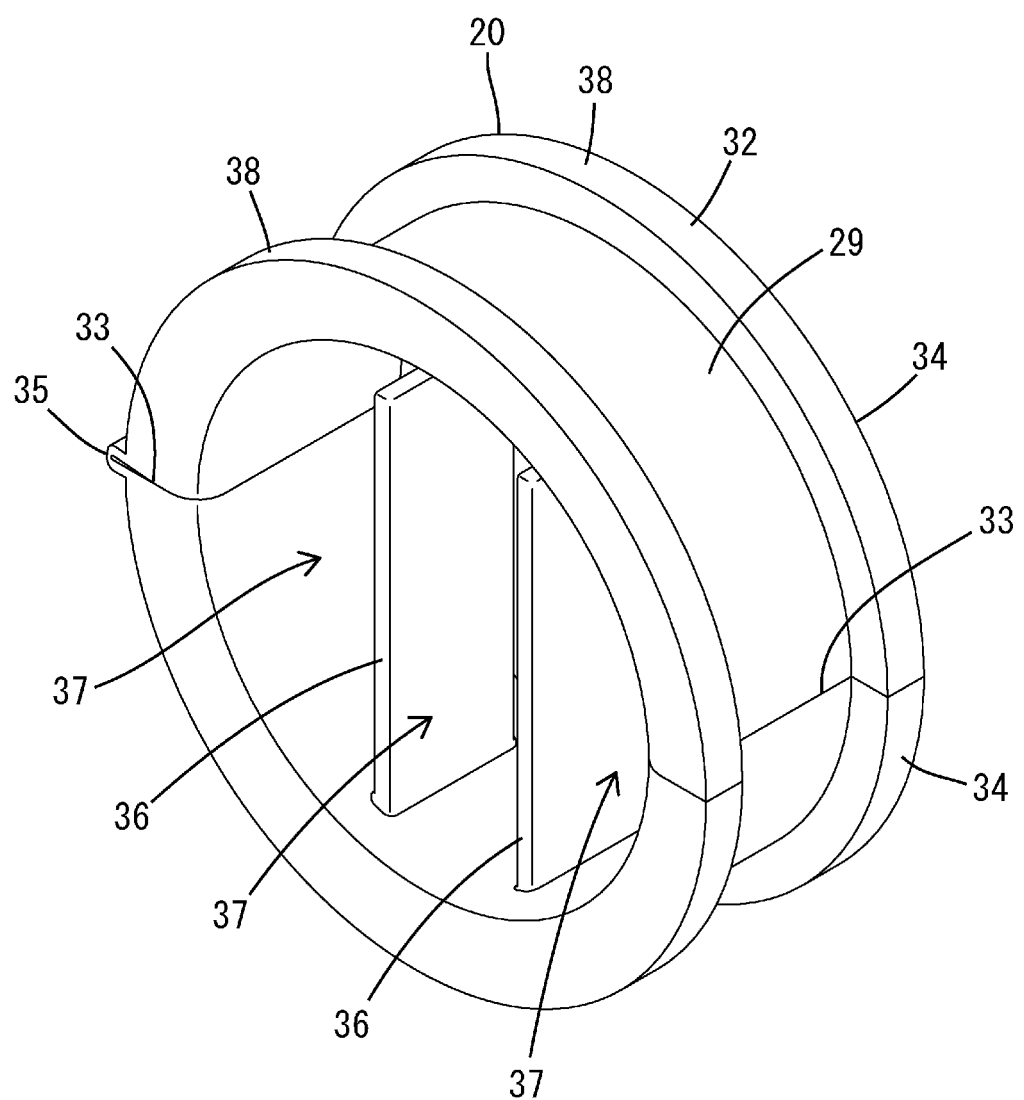
FIG. 4 is a perspective view of a wire routing member.
Figure 5:
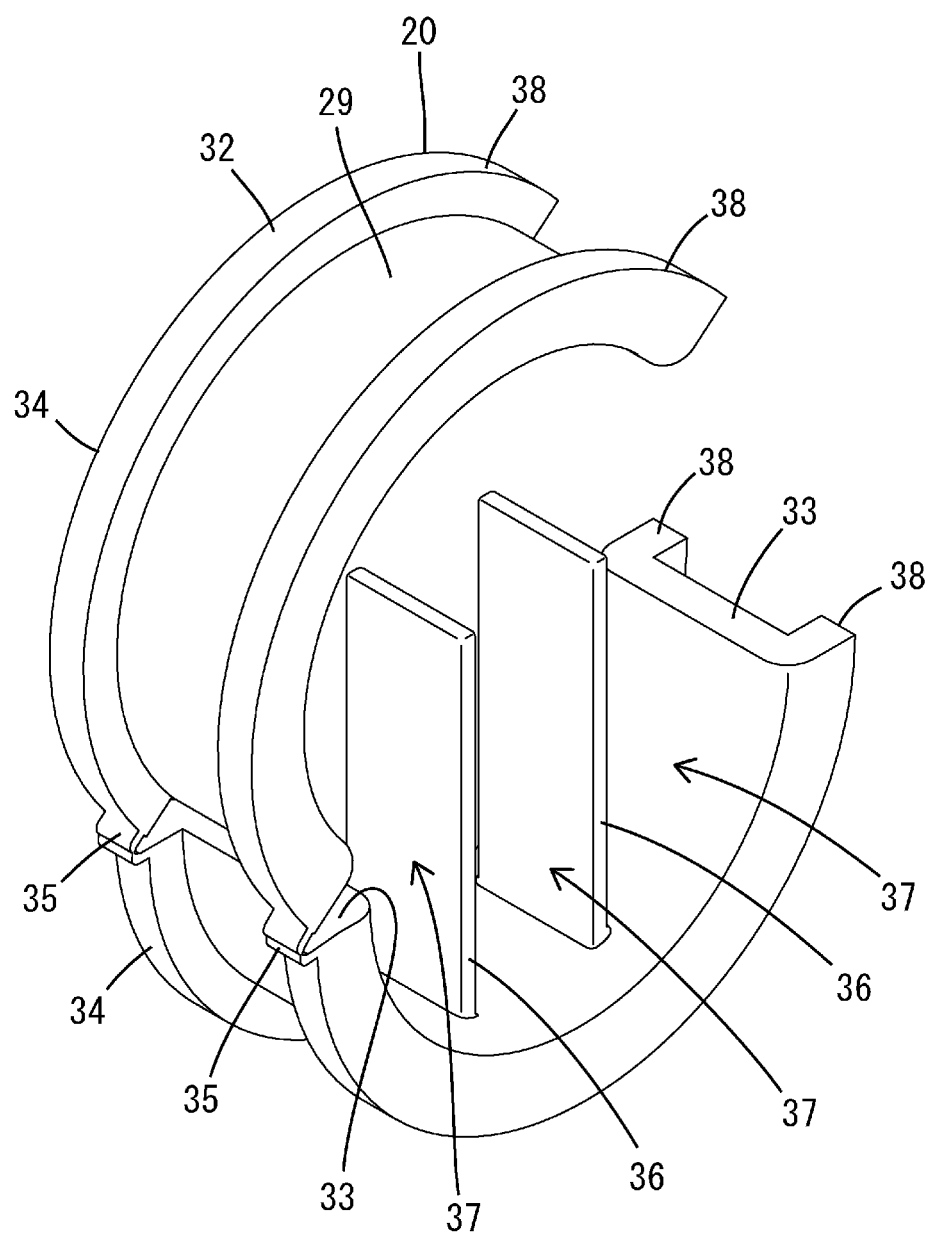
FIG. 5 is a perspective view of the wire routing member in an opened state.

The wire routing member 20 is made of synthetic resin. As shown in FIG. 4, it is constituted by a main body 32 that is cylindrical (annular) as a whole. The main body 32 has a pair of division surfaces 33 along an axial direction on both sides in a diameter direction, and has a pair of divided half sections 34 circumferentially divided via both of the division surfaces 33. Both of the divided half sections 34 have a semicircular arc shape and are connected to each other by flexible hinges 35 provided at the division surfaces 33 at one side in a diameter direction (shown at the left side of the figure). Furthermore, both of the divided half sections 34 are displaceable via the hinges 35 into (i) an opened state (see FIG. 5) in which the division surfaces 33 at the other side in the diameter direction (right side of the figure) are separated and (ii) a closed state (see FIG. 4) in which the division surfaces 33 at the other side in the diameter direction are combined with each other.

Of the divided half sections 34, one divided half section 34 has a plurality of, in the illustrated case, two, partitioning walls 36 (example of a partitioning structure) that stand upright in a vertical plate state at the inner circumferential surface. Each partitioning wall 36 has a rectangular flat plate shape, and the partitioning walls 36 are arranged in parallel at an equal interval in a horizontal direction. Between the inner circumferential surface of one divided half section 34 and the respective partitioning walls 36, three spaces 37 are formed in the horizontal direction. As shown in FIG. 4, when both of the divided half sections 34 are closed, the upper end of each partitioning wall 36 is positioned slightly away from the inner circumferential surface of the other divided half section 34, but the separation distance is made so as to be smaller than an outer diameter of the wires 60.

At each end of the main body 32 (each end in an axial direction), a flange section 38 is projectingly arranged in a diameter direction. Both of the flange sections 38 are arranged around the entire circumference of the main body 32, including the hinges 35. The outer circumferential surface of the main body 32 positioned between both of the flange sections 38 is formed to have a width dimension slightly larger than a width dimension of the band 30 and is made to be the band fastening surface 29 around which the band 30 is wound.

Next, a method of assembling (a method of manufacturing) the wire routing structure 10 of this embodiment 1, and its operation, are explained.

When the wire routing structure 10 is assembled, each wire 60 is inserted through an exterior cladding member (undepicted), and each wire 60 of the extending section 62 is exposed to the outside from the end of the exterior cladding member. Subsequently, both of the divided half sections 34 are made to be opened, and each corresponding wire 60 of the extending section 62 is inserted into a respective space 37 of one divided half section 34. Then both of the divided half sections 34 are made to be closed.

Figure 3:
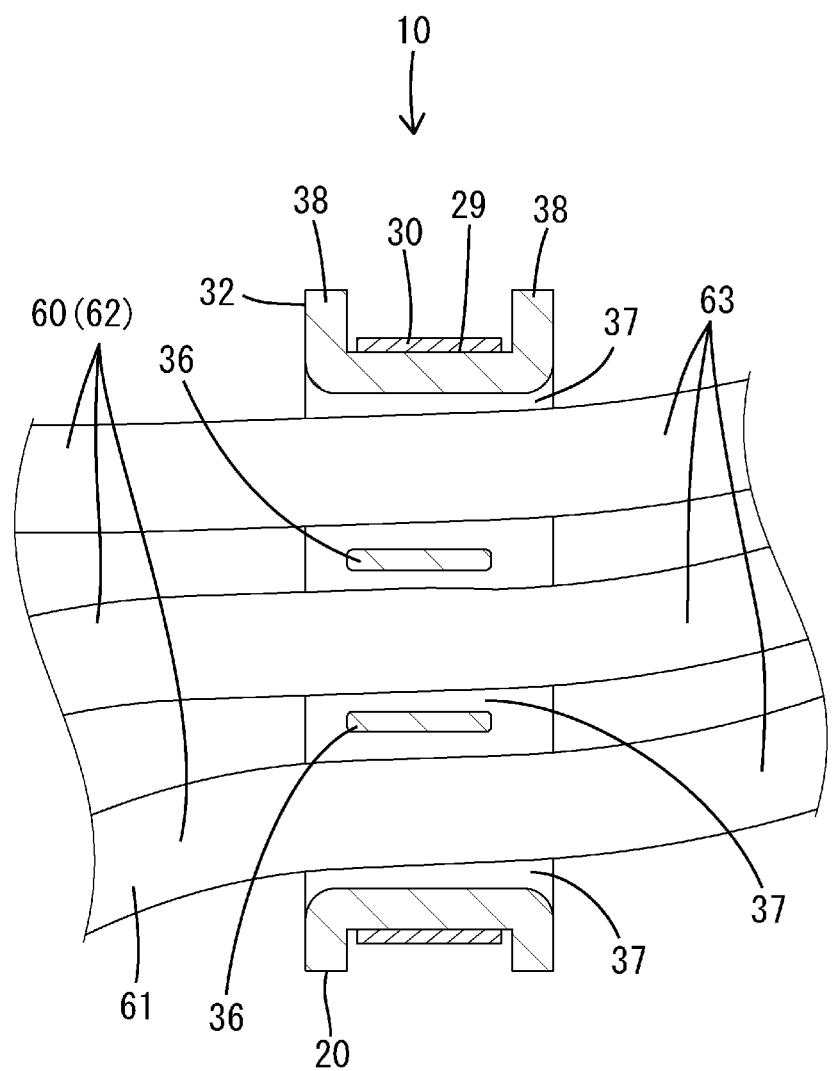
FIG. 3 is a cross-sectional view in a side view direction of the wire routing structure.

Then the band 30 of the vehicle body fixing member 21 is wound once around the band fastening surface 29 of the main body 32 constituting both of the divided half sections 34. As shown in FIG. 1, the wire routing section 20 is held by the vehicle body fixing member 21. In the case of this embodiment 1, a locking means is not provided that holds both of the divided half sections 34 in a closed state, but by having the band 30 wound around the main body 32 so as to be fixed, both of the divided half sections 34 are held in a closed state without having both of the divided half sections 34 return to an opened state. Additionally, as shown in FIG. 3, each wire 60 is accommodated in the corresponding space 37 with some movement allowed.

In a step of winding on the main body 32, the band 30 is guided by both of the flange sections 38. In a state in which the band 30 is wound around the main body 32, both widthwise end edges are arranged to be able to abut on both of the flange sections 38, and position displacement in the width direction is restricted.

Next, as shown in FIG. 2, the vehicle body fixing member 21 is attached and fixed to the vehicle body panel 90 via the fixing section 23. Thus, each wire 60 is held in a state in which arrangement is established at the vehicle body fixing position FP via the wire routing member 20. Then it is connected to a connection counterpart 110 corresponding to each terminal metal fitting 100 connected to the tip end of the extending section 63 of each wire 60. At this time, arrangement of each wire 60 is established by the wire routing member 20 at the vehicle body fixing position FP. Thus, the terminal metal fittings 100 can accurately fit the corresponding connection counterparts 110 (see FIG. 6), and connection work can be accurately and promptly performed. Furthermore, a free length of the extending section 63 of each wire 60 from the vehicle body fixing position FP to the terminal metal fitting 100 is kept long. Thus, drawing in and handling freedom of each wire 60 is large, and easiness of connection work can be ensured.

As explained above, according to this embodiment 1, by having a plurality of wires 60 inserted through the corresponding spaces 37 of the main body 32, arrangement of each wire 60 is established. Thus, each wire 60 can fit a specified connection counterpart 110, and connection work can be smoothly performed.

The main body 32 is held by a separate vehicle body fixing member 21. Arrangement of each wire 60 is established at the vehicle body fixing position FP at which the vehicle body fixing member 21 is fixed to the vehicle body panel 90. The free length of the extending section 63 of each wire 60 extended from the vehicle body fixing position FP is kept long. Thus, the drawing in and handling freedom of each wire 60 can be improved.

Additionally, the main body 32 has a split structure that can be opened via the division surfaces 33, and in an opened state, each wire 60 can be inserted through the corresponding space 37. Thus, routing of each wire 60 to the main body 32 can be performed at a final stage of a manufacturing step (assembly step), and workability can be improved.

Furthermore, according to the wire routing structure 10 of this embodiment 1, the vehicle body fixing member 21 is provided with (i) the fixing section 23 fixed to the vehicle body panel 90 and (ii) the holding section 24 connected to the fixing section 23 and holding the main body 32. Thus, the main body 32 will be placed at the same position as the vehicle body fixing member 21. As a result, the main body 32 itself does not occupy a place, which provides a spatial advantage, and the structure can be simplified.

Furthermore, the holding section 24 comprises a band fixing structure in which the band is wound around the band fastening surface 29 of the main body 32. Thus, even if the size and shape of the outer periphery of the main body 32 are changed, this can be flexibly handled by adjusting a winding diameter of the band 30. Furthermore, an existing clip for fixing a vehicle body can be used as the vehicle body fixing member 21.

<Embodiment 2>

FIGS. 7-10 show embodiment 2 of this invention. Embodiment 2 is different from embodiment 1 in that a wire routing member 20A adds a tongue piece 39 to the wire routing member 20 of embodiment 1, but other parts are the same as in embodiment 1. The same or corresponding components as or to those of embodiment 1 are denoted by the same reference numerals, and a redundant description will be omitted.

Figure 10:
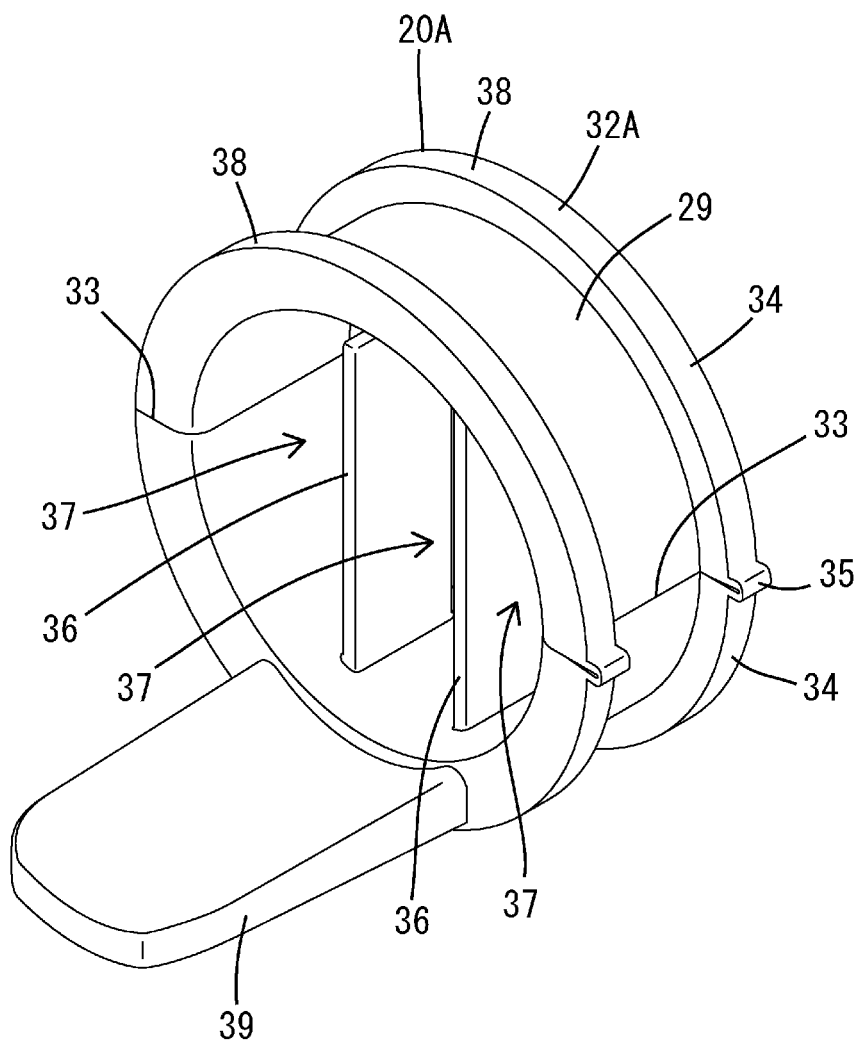
FIG. 10 is a perspective view of the wire routing member of embodiment 2.

The tongue piece 39 is in a plate form that protrudes from a main body 32A of a wire routing member 20A along a direction in which each wire 60 is drawn out. Specifically, as shown in FIG. 10, the tongue piece 39 is configured to project from the lower end surface of one divided half section 34 while curving in an arc shape along the lower end surface.

Figure 7:
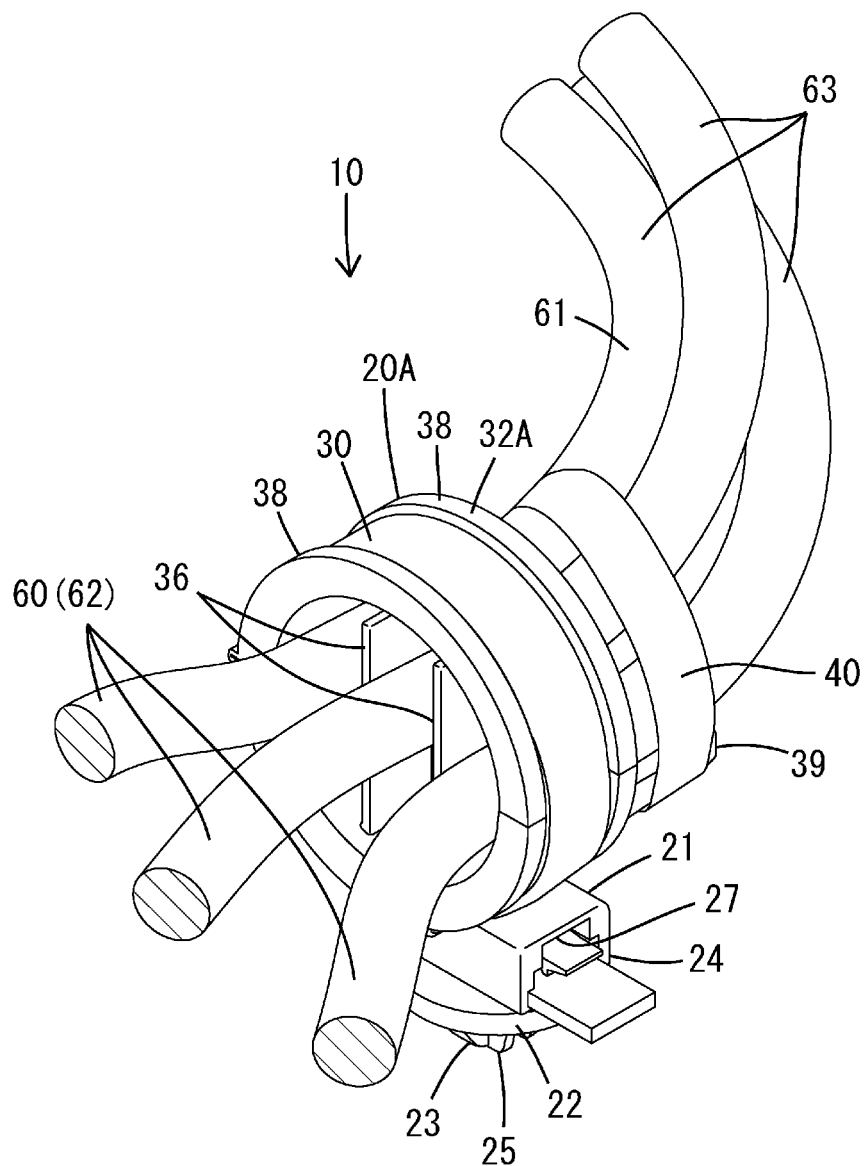
FIG. 7 is a perspective view of a wire routing structure of embodiment 2 of this invention.
Figure 8:
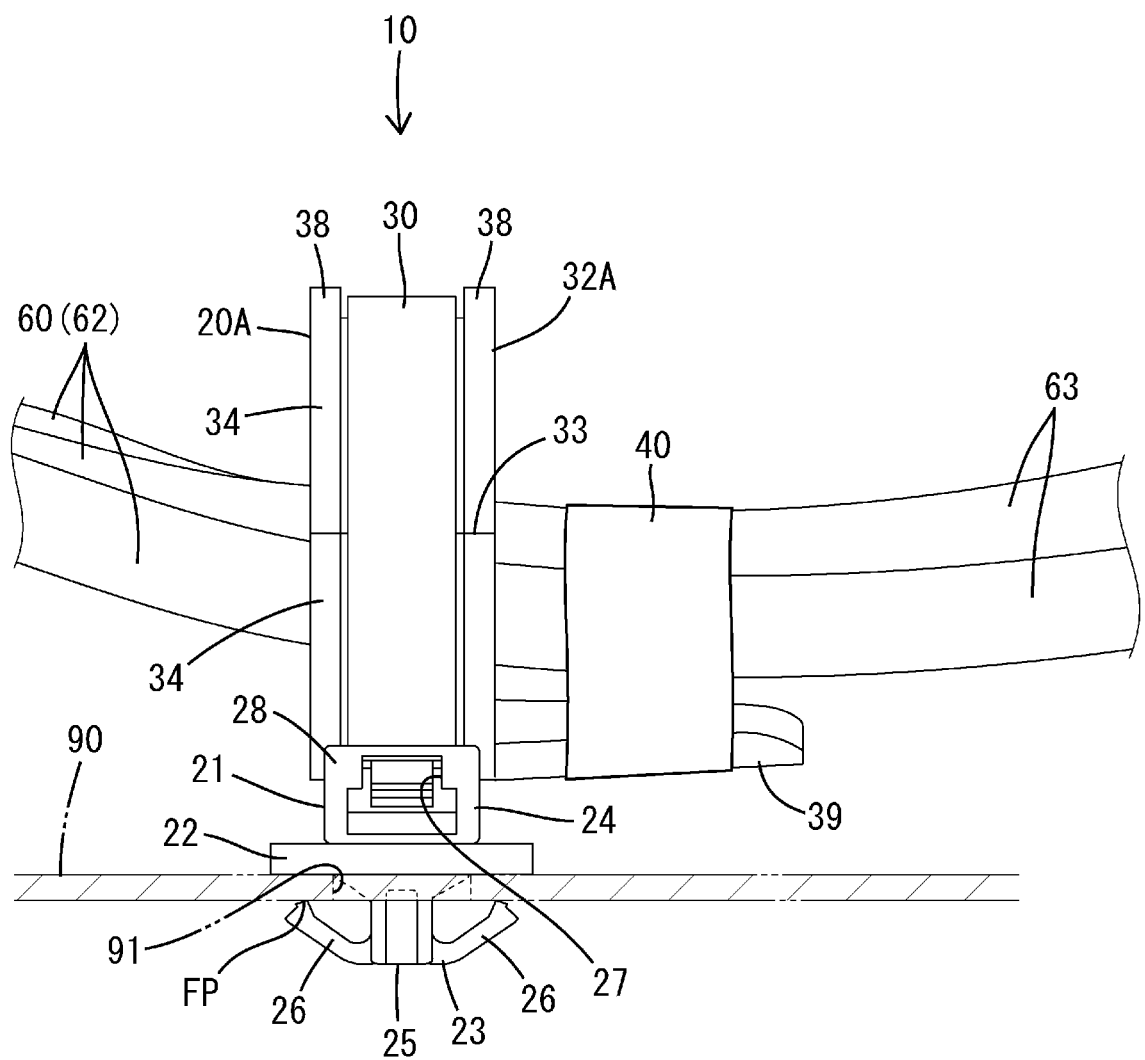
FIG. 8 is a side view of the wire routing structure of embodiment 2.
Figure 9:
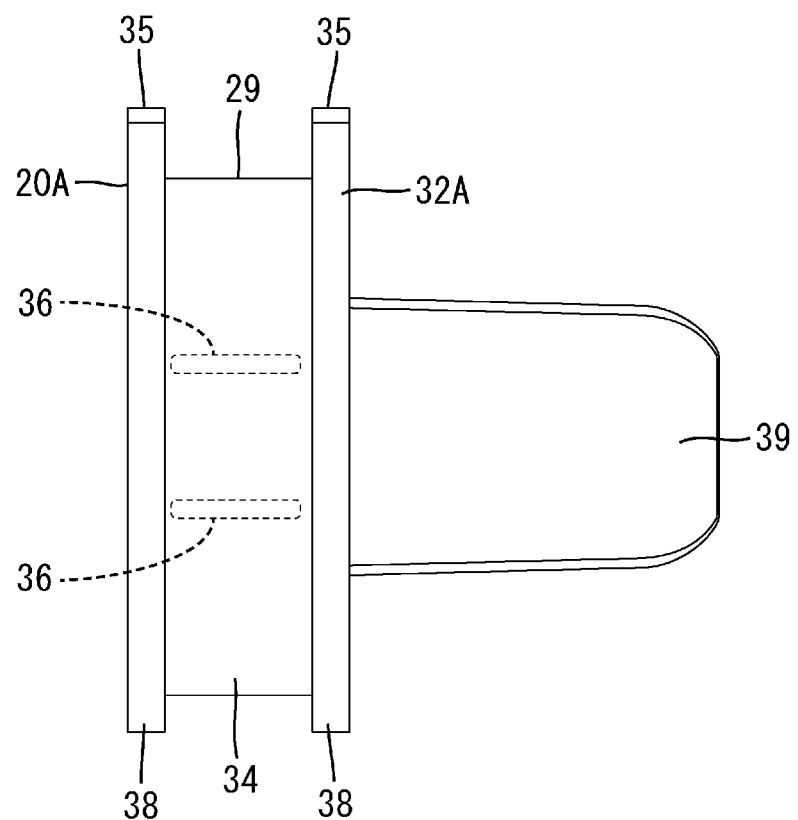
FIG. 9 is a plan view of a wire routing member of embodiment 2.

As shown in FIGS. 7 and 8, in a state in which each wire 60 is inserted through the corresponding space 37 of the main body 32A, a tape 40 such as an adhesive tape is wound around an outer circumference of the tongue piece 39 and the extending section 63 of each wire 60, and each wire 60 is fixed to the tongue piece 39.

According to embodiment 2, by having each wire 60 fixed to the tongue piece 39, each wire 60 is restricted from displacement in the axial direction, and thereby the length of the extending section 63 of each wire 60 can be maintained at a specified value. As a result, each of the terminal metal fittings 100 provided at the tip end of the extending section 63 can more accurately fit the respective connection counterparts 110 at a connection position (see FIG. 6 of embodiment 1), and a situation can be avoided in which misconnection or the like occurs.

<Embodiment 3>

Figure 11:
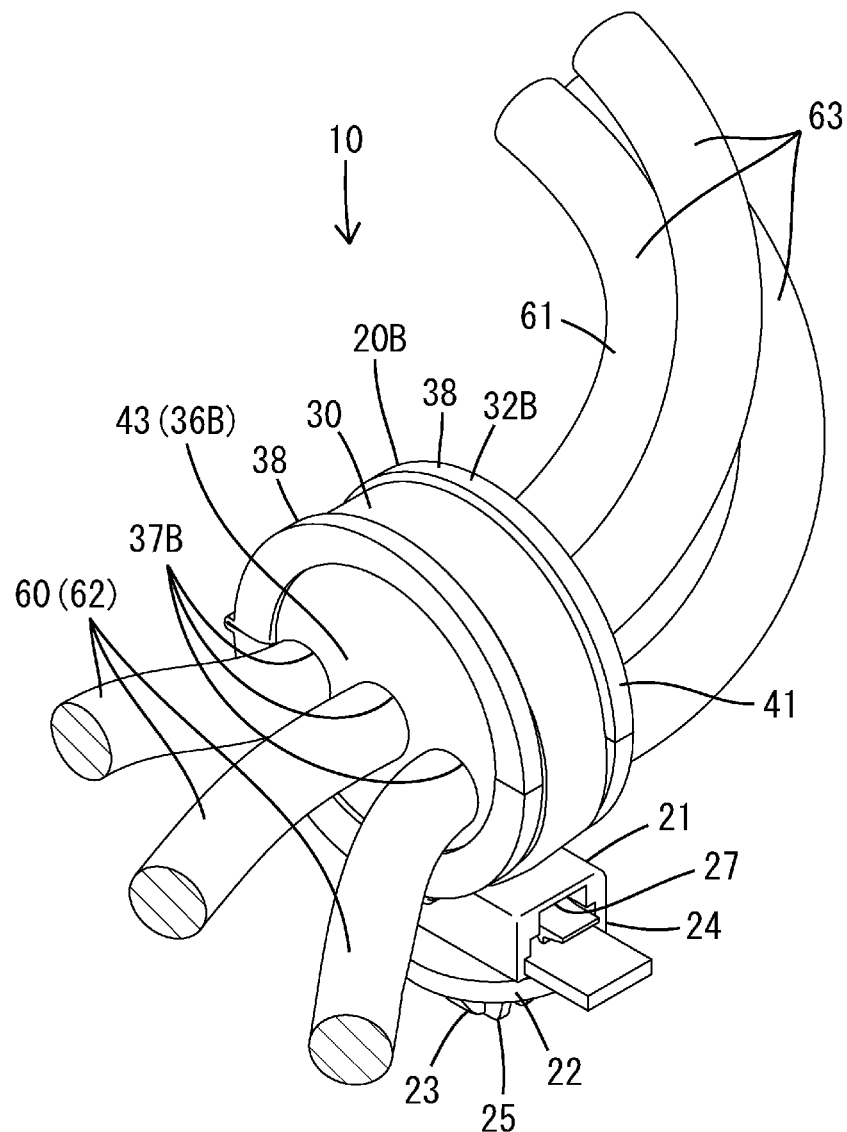
FIG. 11 is a perspective view of a wire routing structure of embodiment 3 of this invention.
Figure 12:
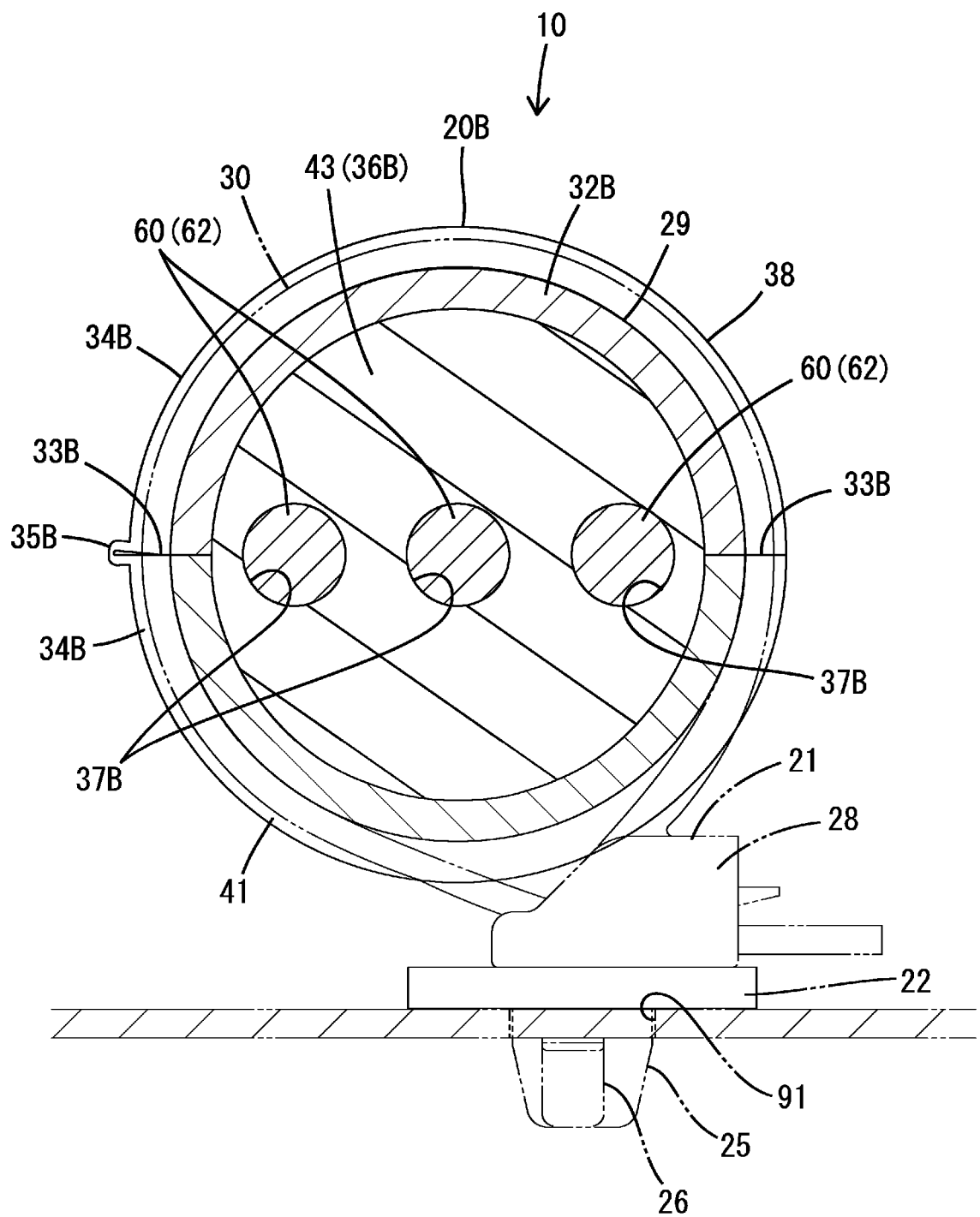
FIG. 12 is a cross-sectional view in a front view direction of the wire routing structure of embodiment 3.
Figure 13:
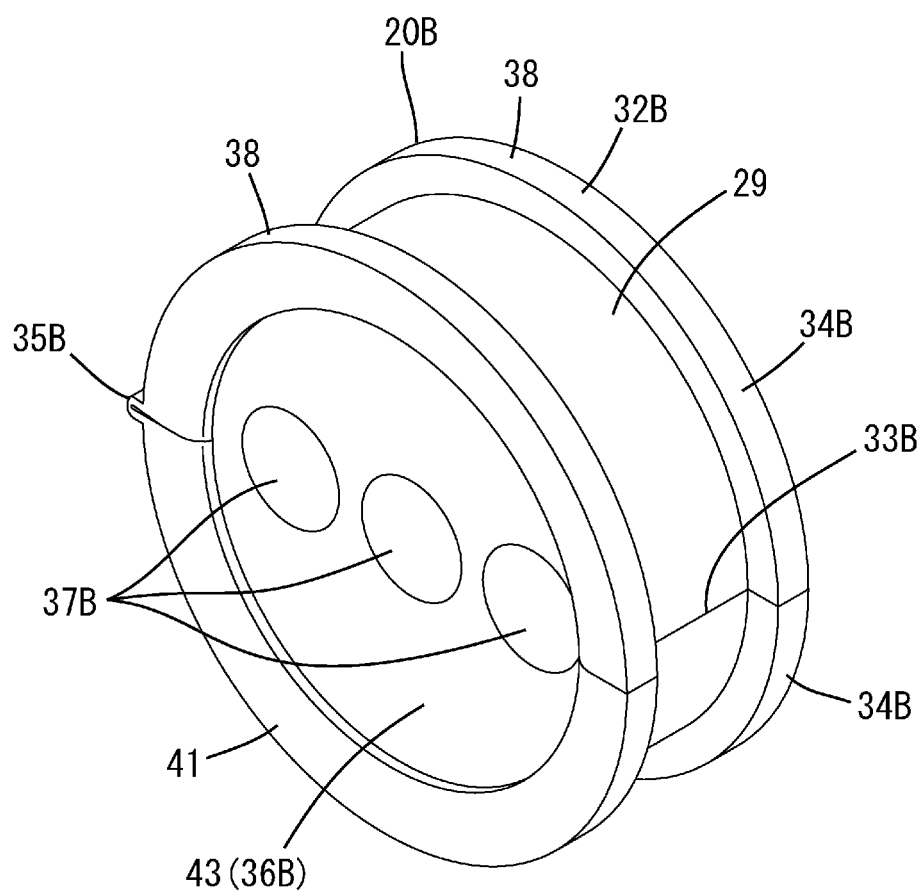
FIG. 13 is a perspective view of the wire routing member of embodiment 3.

FIGS. 11-13 show embodiment 3 of this invention. Embodiment 3 is different from embodiment 1 in that a partitioning structure 36B of a wire routing member 20B is made of a rubber material, but other parts are the same as in embodiment 1. The same or corresponding components as or to those of embodiment 1 are denoted by the same reference numerals, and a redundant description will be omitted.

A main body 32B of the wire routing member 20B has (i) an annular cylindrical section 41 made of synthetic resin having a pair of flange sections 38 and a band tightening surface 29 at an outer circumference, and (ii) an elastic holding section 43 made of rubber such as silicone rubber fitted inside the cylindrical section 41. The cylindrical section 41 is constituted by (i) a pair of divided half sections 34B separated into two parts via division surfaces 33B along the diameter direction and (ii) hinges 35B connecting both of the divided half sections 34B.

The elastic holding section 43 has three spaces 37B, going through the elastic holding section 43 side by side at a position corresponding to the arrangement of the respective wires 60. The partitioning structure 36B is constituted by a solid section of the elastic holding section 43 that divides the outer periphery of each space 37B. Each space 37B is configured to open in a cross-sectional circular shape with an opening diameter slightly smaller than the outer diameter of each wire 60.

When the wire routing structure 10 is assembled, each wire 60 of each extending section 62 is inserted through a respective space 37B of the elastic holding section 43. Thus, each wire 60 is surrounded by the entire circumference of the partitioning structure 36B of the elastic holding section 43 and is elastically held. Subsequently both of the divided half sections 34B are made to be opened. In that state, the elastic holding section 43 is supported by one of the divided half sections 34B. Next, both of the divided half sections 34B are made to be closed, and thereby the elastic holding section 43 is sandwiched between both of the divided half sections 34B. After that, the band 30 of the vehicle body fixing member 21 is wound around and fixed to the band fastening surface 29 of the cylindrical section 41. While both of the divided half sections 34B are maintained in a closed state, the elastic holding section 43 is fittingly held inside the cylindrical section 41.

According to embodiment 3, the partitioning structure 36B of the main body 32B is made of a rubber material, and the wires 60 inserted through the spaces 37B are elastically held by the partitioning structure 36B. Thus, the free length of each extending section 63 of each wire 60 is adjusted to a specified length. As a result, in the same manner as in embodiment 2, each wire 60 can accurately fit the respective connection counterpart 110 (see FIG. 6 of embodiment 1), and a situation can be avoided in which misconnection or the like occurs.

<Reference Example>

Figure 14:
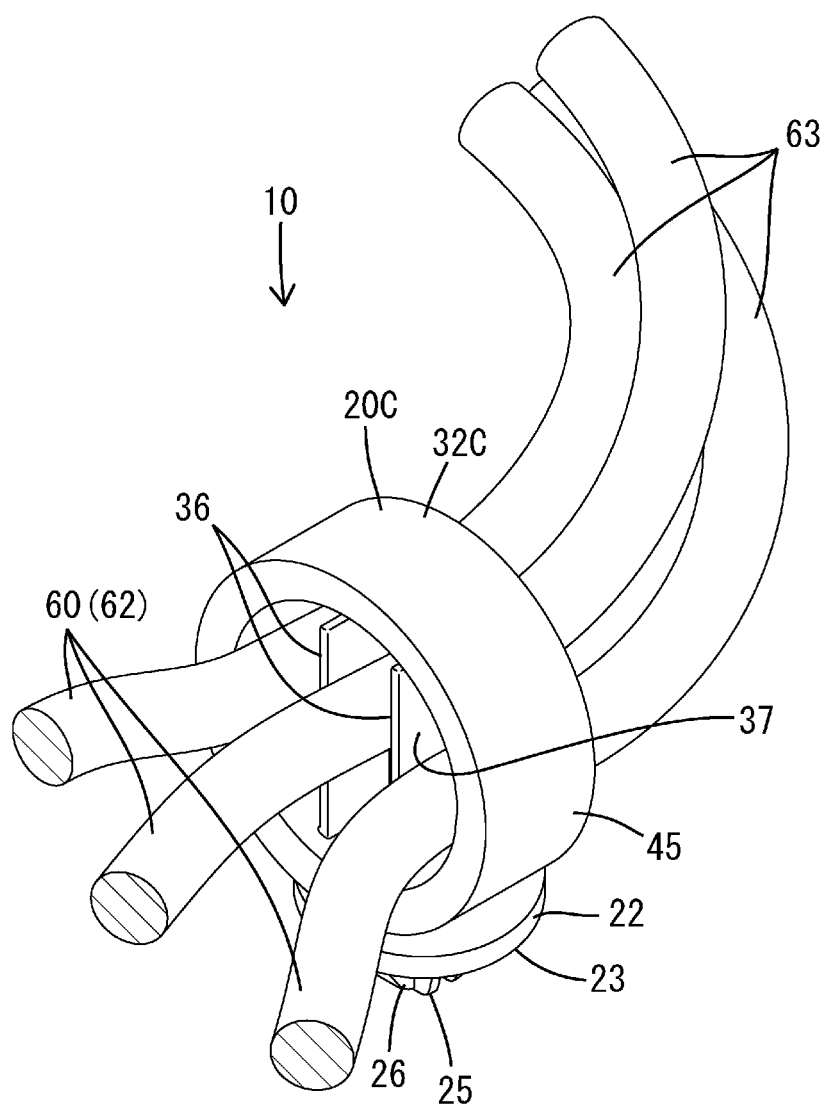
FIG. 14 is a perspective view of a wire routing structure of a reference example of this invention.

FIG. 14 shows a reference example of this invention. The reference example is different from embodiment 1 in that a main body 32C of a wire routing member 20C is formed integrally with a vehicle body fixing member 21C, but other parts are the same as in embodiment 1. The same or corresponding components as or to those of embodiment 1 are denoted by the same reference numerals, and a redundant description will be omitted.

The wire routing member 20C is provided with (i) a main body 32C that is cylindrical (annular) and (ii) a leg-shaped fixing section 23 having a substrate section 22 and a plurality of locking claws 26. The main body 32C and the fixing section 23 are configured to be vertically aligned and integrated to each other. The main body 32C is not configured as a split structure, but configured as a peripheral wall 45 that is continued without any interruptions in a circumferential direction. In the same manner as in embodiment 1, the peripheral wall 45 is provided with two partitioning walls 36 having a vertical-plate shape inside. Between the inner circumferential surface and each partitioning wall 36, each of three spaces 37 is horizontally aligned and partitioned. The corresponding wires 60 are inserted through the respective spaces 37. At the outer circumferential surface of the main body 32C, the band 30 is not wound around, and there is no flange section 38. The substrate section 22 and the fixing section 23 are configured in the same manner as those of the vehicle body fixing member 21 of embodiment 1 and function as a component fixed to the vehicle body panel 90.

In the case of the reference example, arrangement of each wire 60 is established in the wire routing member 20C, and the main body 32C of the wire routing member 20C is formed integrally with the vehicle body fixing member 21C. Thus, this can suppress the number of parts from increasing.

<Other Embodiments>

Other embodiments of this invention will be briefly explained.

(1) Two or more wires can be inserted into one space of the main body.

(2) The respective spaces of the main body can be vertically aligned, or divided and arranged in the circumferential direction.

(3) The vehicle body fixing member is not limited to the above modes, but can use a known item as a clip for fixing a vehicle body.

(4) In embodiments 1-3, a configuration can be used such that hinges are omitted that connect both of the divided half sections, and both of the divided half sections are separated from each other.

(5) In embodiments 1-3, at the band fastening surface of the main body, a non-slip structure can be arranged that restricts the band from displacement in the circumferential direction.

(6) In embodiments 1-3, the main body 32 is displaceable via the hinges 35, which are formed to project radially outward, into (i) an opened state (see FIG. 5) in which the division surfaces 33 at the other side in the diameter direction are separated and (ii) a closed state (see FIG. 4) in which the division surfaces 33 at the other side in the diameter direction are combined. However, the structure is not limited to this. As long as the main body 32 has a structure that can be displaced between the opened state and the closed state, the hinges 35 can be omitted. In this case, for example, instead of the hinges 35, by having a thin-walled structure in which part of the wall of the main body is made thin, the main body can be configured to be displaceable between the opened state and the closed state. This thin-walled structure can be formed at a position different, for example, in the circumferential direction of the main body 32, from the division surfaces 33 at the other side in the diameter direction (in the above embodiments 1-3, a position at which the hinges 35 are formed or the like). The thin-walled structure can be configured, for example, by having a concave section formed at the inner circumferential surface of the main body 32.

(7) In embodiment 2, instead of a tape, a band such as a cable tie can be used as a fixing member by which each wire is fixed to the tongue piece.

(8) In embodiment 3, the entire wire routing member including the partitioning structure can be made of a rubber material.

(9) In embodiment 3, the division surfaces may also be provided so as to cross at the elastic holding section, and the respective spaces can be formed to be divided in half.

EXPLANATION OF SYMBOLS

10 Wire routing structure
20, 20A, 20B, 20C Wire routing members
21, 21C Vehicle body fixing members
23 Fixing section
24 Holding section
32, 32A, 32B, 32C Main bodies
33, 33B Division surfaces
34, 34B Divided half sections
36, 36B Partitioning sections
37, 37B Spaces
39 Tongue piece
60 Wires
90 Vehicle body panel

What is claimed is:

1. A wire routing structure comprising:
a main body held by a vehicle body fixing member, wherein:
the main body includes (a) a plurality of spaces having a plurality of wires inserted therein, and (b) a partitioning structure that partitions the plurality of spaces, the main body having a split structure that allows the main body to be opened via a division surface;
in an opened state of the main body, the plurality of wires can be inserted inside the main body;
the vehicle body fixing member is separate from the main body, and includes (i) a fixing section configured to be fixed to a vehicle body, the fixing section being made of resin material and including a locking claw configured to elastically lock to a hole in a vehicle body panel, and (ii) a holding section connected to the fixing section and holding the main body; and the holding section comprises a band fixing structure including a band wound around an outer periphery of the main body, holding the main body in a closed state.

2. The wire routing structure according to claim 1, wherein:

the main body is provided with a tongue piece that protrudes along a drawn-out direction of the plurality of wires.

3. The wire routing structure according to claim 2, further comprising a fastener that fixes the plurality of wires to the tongue piece.

4. The wire routing structure according to claim 1, wherein:

the partitioning structure is made of a rubber material capable of elastically holding the wires inserted into the plurality of spaces.

5. The wire routing structure according to claim 1, further comprising a hinge that connects together parts of the main body in the opened state.

6. The wire routing structure according to claim 1, wherein the partitioning structure comprises a partitioning wall, a first end of the partitioning wall being attached to the main body.

7. The wire routing structure according to claim 6, wherein the first end of the partitioning wall is attached to an inner circumferential surface of the main body, and a second end of the partitioning wall is separated from the inner circumferential surface of the main body, a minimum distance between the second end and the inner circumferential surface being smaller than an outer diameter of one wire among the plurality of wires.

8. The wire routing structure according to claim 1, wherein the main body further comprises (i) a pair of flange sections arranged around a periphery of the main body, and (ii) a band fastening surface between the pair of flange sections, the band contacting the band fastening surface in the closed state.

9. The wire routing structure according to claim 4, wherein the rubber material is configured to elastically press against individual wires among the plurality of wires.

10. The wire routing structure according to claim 1, wherein the partitioning structure extends inward from an inner periphery of the main body.

\* \* \* \* \*